United States Patent
Redmore

[11] 3,909,200
[45] Sept. 30, 1975

[54] USE OF GUANIDINE DERIVED COMPOUNDS AS CORROSION INHIBITORS

[75] Inventor: Derek Redmore, Ballwin, Mo.

[73] Assignee: Petrolite Corporation, St. Louis, Mo.

[22] Filed: Apr. 9, 1970

[21] Appl. No.: 27,137

Related U.S. Application Data

[62] Division of Ser. No. 640,329, May 22, 1967, abandoned.

[52] U.S. Cl.............. 21/2.7 R; 21/2.5 R; 106/14; 252/8.55 E; 252/390; 260/309.7
[51] Int. Cl.².................. C23F 11/14; E21B 43/22
[58] Field of Search.......... 252/390, 8.55 E; 260/2, 260/246, 309.7; 21/2.7 R, 2.5 R; 106/14

[56] References Cited
UNITED STATES PATENTS

| | | | |
|---|---|---|---|
| 2,325,586 | 8/1943 | Bolton et al. | 260/2 |
| 2,622,075 | 12/1952 | Hemmi et al. | 260/2 |
| 2,734,807 | 2/1956 | Chenicek et al. | 252/390 |
| 2,830,006 | 4/1958 | Birtwell et al. | 260/2 |
| 2,899,442 | 8/1959 | Hughes | 252/390 |
| 2,927,922 | 3/1960 | Hughes | 252/390 |
| 3,403,113 | 9/1968 | Diethelm et al. | 260/2 |

Primary Examiner—Benjamin R. Padgett
Assistant Examiner—Irwin Gluck
Attorney, Agent, or Firm—Sidney B. Ring; Hyman F. Glass

[57] ABSTRACT

The use as corrosion inhibitors of the compounds formed by reacting guanidine-type compounds with polyamines. These compounds are formed by the reaction of guanidine-type compounds, (including compounds which although not guanidine-type compounds are capable of forming guanidine-type compounds).

In general, guanidine-type compounds are those which contain the

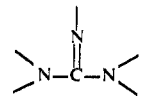

residue and may be illustrated by the following:

guanidine 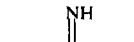

dicyandiamide 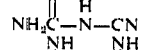

biguanidine 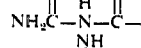

substituted biguanides 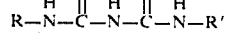

where at least one of the R's, which may or may not be the same, is a substituted group, for example alkyl, aryl, cycloalkyl, alkaryl, aralkyl, etc; and derivatives thereof.

An example of a compound which is not itself a guanidine type compound but is capable of forming a guanidine type compound is cyanamide $NH_2CN$ which reacts with itself to form dicyandiamide.

10 Claims, No Drawings

USE OF GUANIDINE DERIVED COMPOUNDS AS CORROSION INHIBITORS

This application is a Division of Ser. No. 640,329 filed May 22, 1967, now abandoned.

These guanidine-type compounds are reacted with polyamines to form the products of this invention with evolution of ammonia. Although I do not wish to be bound by theoretical consideration as to the products formed, it is believed that the product contains a polymer having cyclic amidine and/or linear amidine groups. For example, where dicyandiamide is reached with diethylene triamine the following type of products is believed to form:

(1) 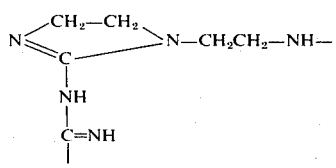

(2) 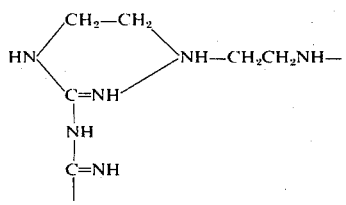

The above formulae illustrate the imidazoline structure. Where a polyamine containing a chain of three carbons rather than two carbons between the amino groups of the polyamine, tetrahydropyrimidine groups are formed, i.e.

(3) 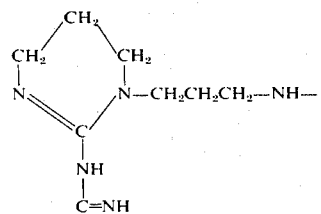

(4) 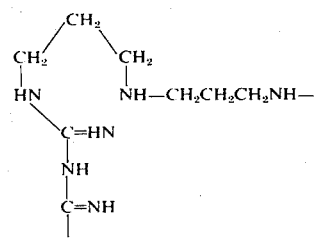

Other analogous compounds may also be formed such as for example where the alkylene group is branched, etc.

Thus, provided the polyamine is cyclic amidineforming (i.e. capable of forming the imidazoline or the tetrahydropyrimidine ring) the carbon chain between nitrogens may or may not be substituted:

i.e. 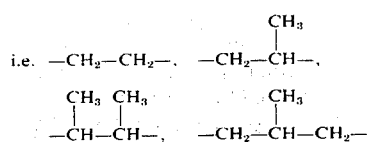

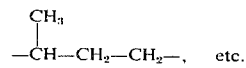, etc.

A wide variety of cyclic amidine-forming polyamines can be employed, for example, those of the formula

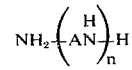

where $n$ is an integer for example 1 – 10 or more where A is alkylene and the polyamine contains at least one A group which is cyclic amidine-forming. Thus, this cyclic amidineforming group has at least one nitrogen to nitrogen chain of 2 to 3 carbon atoms whether branched or not.

Illustrative examples of polyalkylenepolyamines include the following:

ethylene diamine
diethylene triamine
triethylene tetramine
propylenediamine
dipropylenetriamine
tripropylene tetramine
aminoethyl propylene diamine, etc.

The polyamine may also be substituted for example with alkyl, aryl, etc. groups, for example

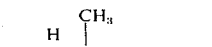

These substituted polyamines may be illustrated by "Duomeen" polyamines where R is a fatty alkyl group derived, for example, from fatty acids such as those having 8 – 18 carbon atoms.

Although the reaction proceeds without a catalyst, a catalyst may be employed to speed up the reaction. Among such catalysts are organic and inorganic salts such as sulfonic acids, etc. However, it is preferred to use sulfur compounds such as $H_2S$, thioacids, thioamides, thioketones, thiourea, dithiobiurette, etc., as catalysts.

In general the temperature of polymerization will vary with the particular reactants, catalysts, etc. In general, the reaction is carried out from about 75° to 200°C., such as from about 100° to 175°C., but preferably from about 150° to 170°C. Optimum temperatures will vary with the particular system.

The following Examples are presented for purposes of illustration and not of limitation.

EXAMPLE 1

Dicyandiamide (42.0g) and tetraethylene pentamine (47.5g) were slowly heated to 120° at which temperature ammonia evolution began. The temperature was increased to 165° and maintained for 6 hours. The product was a water-soluble tacky solid polymer.

EXAMPLE 2

Dicyandiamide (84g) and triethylene tetramine (230g) were heated together at 150°–160° for four hours until ammonia evolution was complete. The product was a dark viscous liquid which was readily water soluble.

EXAMPLE 3

This example illustrates the effect of a catalyst on the reaction. Triethylene tetramine (73.7g) dicyandiamide (26.9g) and thioacetamide (1g) were slowly heated. At 110° ammonia evolution became vigorous and continued rapidly as the temperature was raised to 140°. After 2.5 hours the reaction was complete yielding a product identical with that of Example 2 but milder conditions were required.

EXAMPLE 4

Guanidine carbonate (45g) and diethylene triamine (51.5g) were heated to 115° whereupon ammonia was evolved. By increasing the temperature to 140°–150° the reaction was completed in four hours giving a solid water-soluble polymer.

EXAMPLE 5

Following the procedure of Example 4, guanidine carbonate (45g) was reacted with triethylene tetramine (115g) to yield a viscous water-soluble polymer.

EXAMPLE 6

Triethylene tetramine (115g) and phenyl biguanide (89g) were heated together at 140°–160° for five hours to bring about complete reaction. The product was a viscous polymer which was soluble in alcohol and dilute hydrochloric acid but only slightly water soluble.

EXAMPLE 7

By the procedure of Example 1, dicyandiamide (84g) was reacted with Tetramine No. 2 which is a mixture of polyamines $NH_2(AN^H)_nH$ where $n = 3 - 6$ and A is ethylene (230g) to give a solid polymer.

EXAMPLE 8

Following the procedure of Example 6 a solid polymer was obtained from phenyl biguanide (17.7g) and Tretamine No. 2 (23.1g) which was water-soluble.

EXAMPLE 9

Dodecylamine hydrochloride (222g) was heated at 190° for one hour with dicyandiamide (84g) to give a quantitative yield of N-dodecyl biguanide hydrochloride. This biguanide (43g) was heated with triethylene tetramine (21g) at 180° for four hours to yield a viscous polymer with the evolution of ammonia. This polymer was insoluble in water and had moderate solubility in benzene.

EXAMPLE 10

9(10)-Phenyl stearyl amine hydrochloride (190g) and dicyandiamide (42g) were heated together at 190°–200° with stirring to yield the N-stearyl biguanide hydrochloride. This biguanide (131g) was heated at 180° – 185° with triethylene tetramine (41g) for four hours at which time ammonia evolution was complete. The product was a benzenesoluble polymer.

EXAMPLE 11

This example illustrates the use of a secondary amine in forming the biguanide. Gilsonite GN 300 (containing 2.7 percent secondary nitrogen) was converted to its hydrochloride and reacted at 190° – 195° with dicyandiamide (35g) for 1½ hours to give a biguanide hydrochloride. This biguanide (128g) was reacted with triethylene tetramine (33g) in the manner of previous examples to yield a polymer with ammonia evolution. This polymer was soluble in isopropanol and acetic acid.

Since the following examples were similarly prepared, they are presented in tabular form.

TABLE I

ADDITIONAL EXAMPLES

| Example No. | Guanidine Derivative | Polyamine | Reaction Conditions |
|---|---|---|---|
| 12 | N-cyclohexyl biguanide | Triethylene tetramine | 4 hours at 165°. |
| 13 | N-(p-tolyl)-biguanide | Diethylene triamine | 5 hours at 170°. |
| 14 | N-(p-tolyl) biguanide | Tetraethylene pentamine | 5 hours at 165–170°. |
| 15 | N-(oleyl) biguanide hydrochloride | Triethylene tetramine | 6 hours at 170°. |
| 16 | N,N-diodecyl biguanide hydrochloride | Triethylene tetramine | 6 hours at 160–165°. |

USE AS CORROSION INHIBITORS

This phase of this invention relates to the use of these compounds in inhibiting the corrosion of metals, most particularly iron, steel and ferrous alloys. These compounds can be used in a wide variety of applications and systems where iron, steel and ferrous alloys are affected by corrosion. They may be employed for inhibiting corrosion in processes which require a protective or passivating coating as by dissolution in the medium which comes in contact with the metal. They can be used in preventing atmospheric corrosion, underwater corrosion, corrosion in steam and hot water systems, corrosion in chemical industries, underground corrosion, etc.

The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. These inhibitors may, however, be used in other systems or applications. They appear to possess properties which impart to metals resistance to attack by a variety of corrosive agents, such as brines, weak inorganic acids, organic acids, $CO_2$, $H_2S$, air or oxygen, etc.

The method of carrying out this process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, air or oxygen, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor is a solid, it may be dropped into the well as a solid lump or stock, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow or fluids. After being so treated, the well should be left closed in for a period of time sufficient to permit the reagent to drop to the bottom of the well.

For injection into the well annulus, the corrosion inhibitor is usually employed as a solution in a suitable solvent. The selection of solvent will depend much upon the specific reagent being used and its solubility characteristics.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently.

The protective action of the herein described reagents appears to be maintained for an appreciable time after treatment ceases, but eventually is lost unless another application is made.

For example, for the protection of gas wells and gas-condensate wells, the amount of corrosion inhibitor used might range between about ¼ to 3 lbs. per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less corrosion inhibitor than usually would be required for neutralization of the acids produced.

These compounds are particularly effective in the prevention of corrosion in systems containing a corrosive aqueous medium, and most particularly in systems containing brines.

These reagents can also be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention, in sufficient amounts to prevent the corrosion of metals employed in such operation.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

Because of the corrosive nature of oil field brines, to economically produce oil by water flooding, it is necessary to prevent or reduce corrosion since corrosion increases the cost thereof by making it necessary to repair and replace such equipment at frequent intervals.

I have discovered a method of preventing corrosion in systems containing a corrosive aqueous media, and most particularly in systems containing brines, which is characterized by employing the compounds described herein. For example, I have discovered an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation an aqueous solution of the compositions of this invention.

The invention, then, is particularly concerned with preventing corrosion in a water flooding process characterized by the flooding medium, containing an aqueous or an oil field brine solution of these reagents.

In many oil fields large volumes of water are produced and must be disposed of where water flooding operations are not in use or where water flooding operations cannot handle the amount of produced water. Most States have laws restricting pollution of streams and land with produced waters, and oil producers must then find some method of disposing of the water produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The compounds of this invention can also be used in such water disposal wells thus providing a simple and economical method of solving the corrosion problems encountered in disposing of unwanted water.

Water flood and waste disposal operations are too well known to require further elaboration. In essence, the flooding operation is effected in the conventional manner except that the flooding medium contains a minor amount of these compounds, sufficient to prevent corrosion.

While the flooding medium employed in accordance with the present invention contains water or oil field brine and the compounds of this invention, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. similarly, they may be employed in conjunction with any of the operating techniques commonly employed in water flooding and water disposal processes, for example five spot flooding, peripheral flooding, etc. and in conjunction with other secondary recovery methods.

The concentration of the corrosion inhibitors of this invention will vary widely depending on the particular compound, the particular system, etc. Concentrations of at least about ¼ ppm, such as about ¾ to 7,500 ppm for example about 1 to 5,000 ppm, advantageously about 10 to 1,000 ppm, but preferably about 15 – 250 ppm may be employed. Larger amounts can also be employed such as 1.5 – 5.0 percent although there is generally no commercial advantage in so doing.

For example, since the success of a water flooding operation manifestly depends upon its total cost being less than the value of the additional oil recovered from the oil reservoir, it is quite important to use as little as possible of these compounds consistent with optimum corrosion inhibition. Since these compounds are themselves inexpensive and are used in low concentrations, they enhance the success of a flood operation by lowering the cost thereof.

By varying the constituents of the composition, the compounds of this invention can be made more oil or more water soluble, depending on whether the composition is to be employed in oil or water systems.

Although the manner of practicing the present invention is clear from the foregoing description, the following non-limiting specific examples are included for purposes of illustration.

EXAMPLES

These tests were run under conditions so set up as to simulate those found in an actual producing well. The test procedure involved the measurement of the corrosive action of fluids inhibited by the compositions herein described upon sandblasted SAE 1020 steel coupons measuring ¼ inch in diameter and being 4 inches long when compared to test coupons containing no inhibitor and commercial inhibitors.

Clean quart bottles were half-filled (almost 400 ml.) with 10 percent brine which had been saturated with hydrogen sulfide. Those requiring inhibitor were charged with the same by pipetting calculated amounts contained in suitable solvents (water, isopropyl alcohol, mineral spirits) to give the required parts per million of inhibitor. Uninhibited blanks were run in conjunction with inhibited solutions. The bottles were now filled (total volume now 800 ml.) leaving a small air space for expansion. The bottle caps containing three coupons were then placed on the bottles. These bottles were placed in a rocking apparatus at 115°F. and the coupons connected to an instrument which will read corrosion rates instantaneously.

When the inhibitor was oil-soluble as contrasted to water-soluble, a two-phase system was used instead of the "all-brine" system and this simply consisted of using hydrogen sulfide saturated mineral spirits to replace 25 percent by volume of the brine.

Measurement of corrosion rates was made after 48 hours to determine the effectiveness at the inhibitor compositions. The quantitative measure of the inhibitor was expressed as percent protection calculated according to the following formula:

$$\frac{R_1 - R_2}{R_1} \times 100 = \text{percent protection}$$

in which $R_1$ is the corrosion rate in the uninhibited fluids and $R_2$ is the corrosion rate in inhibited fluids. The results are presented in Table II.

All of the compositions prepared in Examples 1 – 16 are excellent corrosion inhibitors when tested and compared with the commercial corrosion inhibitors previously selected as the best commercial inhibitors for the corrosion system. The following examples are presented as exemplary.

TABLE II

Corrosion tests using rocking bottle apparatus.
H₂S - saturated brine

| Inhibitor Compound of Example | Concentration 20 ppm Protection |
|---|---|
| 1 | 59% |
| 2 | 70% |
| 4 | 65% |
| 5 | 74% |
| 6 | 71% |
| Best Commercial Inhibitor for System | 50% |

WATER CLARIFICATION

The present invention also relates to a method for the clarification of water containing suspended matter.

Accordingly clarification of water containing suspended particles of matter is effected by adding to such water compounds of this invention.

Water containing suspended particles which may be treated by the present invention may have its origin either in natural or artificial sources, including industrial and sanitary sources. Waters containing suspended particles of natural origin are usually surface waters, wherein the particles are suspended soil particles (silt), although sub-surface waters may also be treated according to the present invention. Water having its origin in industrial process (including sanitary water) operations may contain many different varieties of suspended particles. These particles are generally the result of the particular industrial or sanitary operation concerned. Prior to discharging such industrial waste waters into natural water courses it generally is desired that the suspended matter be removed.

The present process may likewise be applied to water contained in stock or fish ponds, lakes or other natural or artificial bodies of water containing suspended solids. It may be applied to industrial water supplied either in preparation therefor, during or after use and prior to disposal. It may be applied to sanitary water supplies either for the elimination of suspended solids prior to use for such purposes, or it may be applied to such waters which have become contaminated with impurities from any source.

Most naturally occurring waters contain an amount of simple electrolytes (sodium, potassium, ammonium, calcium, aluminum salts, etc.) in excess of that necessary for the initial aggregation of the ultimate silt particles. This is likewise true of particles of suspended material in industrial or sanitary waters. The ultimate particles of silt or other materials are therefore naturally somewhat aggregated by reason of the presence of such electrolytes. However, the forces binding such ultimate particles together are not great and more-over are not such as to generally effect either rapid settling rates of the flocculated material or strong enough to prevent deflocculation.

The compounds of this invention cause rapid flocculation and also reinforce the formed aggregates of particles causing a general tightening or bonding together of the initial particles and an increased rate of coagulation and settling, thus forming a less turbid supernatant liquid.

The addition of the compounds of this invention to the water suspension should be made in such a fashion that the resulting flocculation and aggregation of the particles takes place uniformly throughout the body of water. In order to obtain a uniform addition of the compositions of the invention to the water-borne suspension it is generally desirable to prepare a relatively dilute stock solution of the compositions and then to add such solution to the body of water in the proportions indicated. Clarification may take place either in the natural body of water or it may be caused to take place in hydraulic thickeners of known design.

The amount of the compositions to be employed will vary depending upon the amount and the degree of subdivision of the solids to be agglomerated or flocculated, the chemical nature of such solid and the particular inventive compositions employed. In general, I employ at least a sufficient amount of the compositions to promote flocculation. In general, I employ 0.005 – 10,000 ppm or more such as about 0.5 – 1,000 ppm, for example about 1 – 500 ppm, but preferably about 2 – 5 ppm. Since the economics of these processes are important, no more than the minimum amount required for efficient removal is generally employed. It is desired, of course, to employ sufficient compositions so flocculation will take place without causing the formation of stable dispersions.

The precipitating action of the compositions can be employed in the application of loading or filling materials to textiles or paper.

In the processing of fine mineral particles in aqueous suspension the flocculating agents will be especially useful. In the processing of ores to separate valuable mineral constituents from undesirable matrix constituents, it is frequent practice to grind the ore into a finely divided state to facilitate separation steps such as selective flotation and the like. In many ore dressing procedures, the finely divided ore is suspended in water to form a pulp or slime. After processing, it is usually desirable to dewater the pulps or slimes either by sedimentation or filtering. In such operations, certain ores are particularly trouble-some in that the finely divided ore, when suspended in water, forms a stable slime which settles very slowly, if at all. Such slimes are unsuitable for concentration or dewatering by sedimentation and are difficult to dewater by filtration because of the tendency to clog the pores of the filter, thus leading to excessively timeconsuming and inefficient operation of the filters. In some cases, for example, in certain phosphate mining operations, the formation of very stable suspensions of finelydivided mineral results not only in the loss of considerable valuable mineral as waste but also requires large expenditures for the maintenance of holding ponds for the waste. Similar problems are involved in processing gold, copper, nickel, lead, zinc, iron, such as taconite ores, uranium and other ores, and the inventive flocculating agents will be useful in these operations.

Some specific additional applications for the compositions of this invention, not intended to be limiting but merely illustrative are listed below. The compositions can be used for the clarification of beers or wines during manufacture. Another use is in processing effluents in pharmaceutical operations for the recovery of valuable products or removal of undesirable by-products. A particularly important use for these flocculating agents is in the clarification of both beet sugar and cane sugar juices in their processing. Still another use is for flocculation and recovery of pigments from aqueous suspensions thereof. The compositions will be particularly useful in sewage treatment operations as a flocculating agent. A further use is to promote by flocculation the removal of coal from aqueous suspensions thereof. In other words, the flocculating agents of the invention are generally useful for processing aqueous effluents of all types to facilitate the removal of suspended solids.

A water soluble or water dispersible compound, to the extent of effective concentration, is employed.

These compositions can also be employed in the process of flocculating white water and/or recycling of the precipitate solids in the paper making process described in U.S. application Ser. No. 347,023, filed Feb. 24, 1964, now abandoned, and other processes described therein.

Although the manner of practicing the present invention is clear from the foregoing description, the following non-limiting specific examples are included for purposes of illustration.

Naturally occurring water from many sources, and in some instances, brine and brackish waters are used in the recovery of petroleum by secondary water-flooding operations. Clarification of the water is necessary in many instances prior to water flooding because the suspending impurities tend to plug the underground formations into which waters are pumped.

EXAMPLES

A suspension of FeS in brine was subjected to the action of the water-soluble compounds prepared herein.

In these tests, the FeS concentration is 25 parts per million and 1 percent and 5 percent brine solution were used. Metered quantities (500 ml.) of the homogeneous suspension were placed into 1000 ml. beakers and stirred at 100 rpm. The compound to be tested was injected into the suspension to give final active concentrations varying between 2 through 4 parts per million. A commercial flocculant was run simultaneously at equivalent concentrations for comparison and the stirring was achieved by use of a Phipp and Bird "floc" multi-stirrer. After one minute the stirring rate was reduced to 20 to 30 rpm and maintained thus for 10 minutes. At this time the stirring was stopped. The evaluation of the compound started at the moment of flocculation and continued with respect to the "floc" size and rate of precipitation. The final evaluation was achieved by visual examination of the color of the resultant aqueous phase.

The results obtained by employing the water-soluble compounds of Table I, for example, i.e. Examples 1 through 5 and 7 and 8, are found to be superior to the commercial flocculating agent usually employed.

These compounds are also effective in flocculating the other systems described herein.

The following is a partial list of industrial systems in which the compounds of the present invention can be employed as flocculating agents.

1. Petroleum industry
2. Food industry such as in the dairy industry, the canning, freezing and dehydration industries
3. Metal plating industry
4. Chemical and pharmaceutical industries
5. Mining industry, for example, in the phosphate mining industry such as in phosphate slimes
6. Fermentation industries, such as in alcohol, beer, yeast, antibiotics, etc. production
7. Tanning industry
8. Meat packing and slaughter house industry
9. Textile industry
10. Sugar refining industry
11. Coal industry
12. Soap industry
13. Sewage purification
14. Corn starch industry
15. Fat processing and soap industry
16. Paper industry
17. Hydroelectric plants, atomic energy operations, boiler plants, etc.

OTHER DERIVATIVES

These products may be further reacted to form derivatives thereof, for example, they may be oxyalkylated with alkylene oxides such as ethylene oxide, propylene oxide, butylene oxide, octylene oxide, alone or in combination; with styrene oxide, glycide, methyl glycide, allyl glycidyl ether, glycidyl isopropyl ether, glycidyl phenylether, diepoxides, polyepoxides, etc.

They may be reacted with alkylene imines such as ethyleneimine, propylene imine, etc., dialkylamino-epoxypropane of the structure

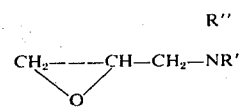

where the R's are alkyl, etc.

They may be acylated with monocarboxylic acids, such as aromatic acids, fatty acids, aliphatic acids, etc. and polycarboxylic acids aliphatic dicarboxylic acids, aromatic dicarboxylic acids for example digly colic, phthalic, succinic, etc., acids.

These compounds may also be treated with more than one agent, for example, they may be partially acylated, then oxyalkylated, partially oxyalkylated than acylated, etc.

They may be alkylated, quaternized, used to prepare salts of organic acids, etc.

OTHER USES

In addition to the uses described above, these compositions and/or derivatives thereof, can be used as follows:

1. as demulsifiers for water-in-oil and oil-in-water emulsions
2. as biocides i.e. bacteriocides, algicides, etc.
3. as additives to various petroleum fuels including gasoline, diesel fuel, jet fuels, etc.
4. as gasoline anti-icers and anti-stallers
5. as flotation agents, such as flotation collection agents
6. as emulsifiers, for example, in metal cleaners, auto polishes, wax emulsions, etc.
7. As additives for sludging oil and cutting oils
8. as fuel "dehazing" agents
9. as agents for preparing emulsions for the "hydrofrac" process of enhancing oil recovery
10. as agents to prepare polymer emulsions
11. as agents for the textile industry such as mercerizing assistants, wetting agents, rewetting agents, penetrating agents, dispersing agents, softening agents, dyeing assistants, etc.
12. as anti-static agents for textiles, plastics, etc.
13. as agents in leather processing
14. as lube oil additives
15. as emulsifiers for insecticidal and agricultural compositions
16. as additives for primer paints to help insure adhesion to metallic surfaces and give corrosion protection
17. as additives useful as a freeze-thaw stabilizer for latex-base paints
18. as agents for the pulp and paper industry, such as sizing aids, etc.
19. as general metal deactivators
20. scale inhibitors

Having thus described my invention what I claim as new and desire to obtain by letters of patent is:

1. The process of inhibiting corrosion of metals comprising treating said metals with the polymer product formed by reacting (A) a compound selected from the group consisting of a cyanamide compound, a dicyandiamide compound, a guanidine compound and a biguanide compound and (B) a polyamine.

2. The process of claim 1 wherein the polyamine is a polyalkylenepolyamine.

3. The process of claim 2 wherein the polyalkylenepolyamine is of the formula

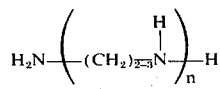

and $n$ is 1–10.

4. The process of claim 1 wherein the polymer product has recurring units selected from the group consisting of A. the unit of the formula

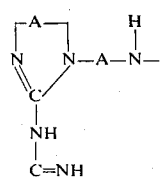

and

B. the unit of the formula

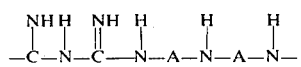

and

C. a mixture of (A) and (B), wherein A is alkylene.

5. The process of claim 4 wherein A is $(CH_2)_{2-3}$.

6. The process of claim 1 wherein (A) is dicyandiamide and (B) is

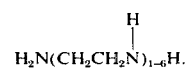

7. The process of claim 1 wherein (A) is a guanidine salt and (B) is

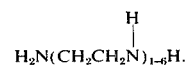

8. The process of claim 1 wherein (A) is a biguanidine and (B) is

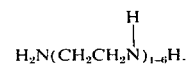

9. The process of claim 1 wherein the polyamine is a Gilsonite amine.

10. The process of claim 1 wherein the polyamine is of the formula

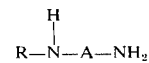

and A is alkylene and R is a fatty alkyl group of 8–18 carbon atoms.

* * * * *